United States Patent
Singh et al.

(10) Patent No.: US 7,039,018 B2
(45) Date of Patent: May 2, 2006

(54) TECHNIQUE TO IMPROVE NETWORK ROUTING USING BEST-MATCH AND EXACT-MATCH TECHNIQUES

(75) Inventors: Ranjeeta Singh, Sunnyvale, CA (US); Larry B. Huston, Wexford, PA (US)

(73) Assignee: Intel Corporation, Santa Clara, CA (US)

( * ) Notice: Subject to any disclaimer, the term of this patent is extended or adjusted under 35 U.S.C. 154(b) by 76 days.

(21) Appl. No.: 10/197,981

(22) Filed: Jul. 17, 2002

(65) Prior Publication Data

US 2004/0013113 A1    Jan. 22, 2004

(51) Int. Cl.
  *H04L 12/28* (2006.01)
  *H04L 12/56* (2006.01)
  *G06F 17/00* (2006.01)

(52) U.S. Cl. ............... 370/255; 370/392; 370/395.32; 707/3; 709/238; 711/216; 711/221

(58) Field of Classification Search ............... 370/389, 370/392, 393, 395.31, 395.32, 254, 255, 370/395.1, 395.3, 400, 401, 351; 707/3, 707/100, 200; 709/220, 223, 224, 238, 245; 711/202, 212, 216, 221

See application file for complete search history.

(56) References Cited

U.S. PATENT DOCUMENTS

| | | | |
|---|---|---|---|
| 5,524,254 A * | 6/1996 | Morgan et al. ............. 709/245 |
| 5,583,996 A | 12/1996 | Tsuchiya |
| 5,761,440 A | 6/1998 | De Marco et al. |
| 5,825,768 A | 10/1998 | Kimbrow et al. |
| 5,884,297 A | 3/1999 | Noven |
| 5,940,396 A | 8/1999 | Rochberger |
| 6,011,795 A * | 1/2000 | Varghese et al. ............. 370/392 |
| 6,018,524 A * | 1/2000 | Turner et al. ............... 370/392 |
| 6,052,683 A | 4/2000 | Irwin |
| 6,061,712 A | 5/2000 | Tzeng |
| 6,115,615 A | 9/2000 | Ota et al. |
| 6,212,184 B1 * | 4/2001 | Venkatachary et al. ..... 370/392 |
| 6,359,879 B1 * | 3/2002 | Carvey et al. .............. 370/351 |
| 6,389,024 B1 | 5/2002 | Ghai et al. |

(Continued)

FOREIGN PATENT DOCUMENTS

GB    2 350 534 A    11/2000

(Continued)

OTHER PUBLICATIONS

Newton, Harry, "Newton's Telecom Dictionary", Telecom Books, 16th Edition, pp. 68 and 456.*

(Continued)

*Primary Examiner*—Alpus H. Hsu
(74) *Attorney, Agent, or Firm*—Kacvinsky LLC

(57) ABSTRACT

A method and apparatus to search for routing information is described. According to an embodiment, a technique is described to search for routing information that uses a first technique on at least a portion of a first section of an address and a second technique on at least a portion of a second section of an address. In one embodiment, a best-match technique, such as a Longest Prefix Match technique, is used on at least a portion of a topology section of an address, and an exact-match technique is used on a portion of an interface ID of the address.

23 Claims, 7 Drawing Sheets

U.S. PATENT DOCUMENTS

| | | | |
|---|---|---|---|
| 6,396,842 B1* | 5/2002 | Rochberger | 370/408 |
| 6,430,527 B1 | 8/2002 | Waters et al. | |
| 6,449,256 B1* | 9/2002 | Varghese et al. | 370/238 |
| 6,522,632 B1 | 2/2003 | Waters et al. | |
| 6,567,380 B1 | 5/2003 | Chen | |
| 6,581,106 B1 | 6/2003 | Crescenzi et al. | |
| 6,594,268 B1* | 7/2003 | Aukia et al. | 370/400 |
| 6,636,498 B1 | 10/2003 | Leung | |
| 6,650,642 B1 | 11/2003 | Sugai et al. | |
| 6,665,297 B1* | 12/2003 | Hariguchi et al. | 370/392 |
| 6,678,678 B1* | 1/2004 | Lee et al. | 707/3 |
| 6,691,171 B1 | 2/2004 | Liao | |
| 6,731,643 B1* | 5/2004 | Cucchi et al. | 370/401 |
| 6,765,896 B1* | 7/2004 | Ahmed et al. | 370/338 |
| 6,775,737 B1 | 8/2004 | Warkhede et al. | |
| 6,778,530 B1* | 8/2004 | Greene | 370/389 |
| 6,792,423 B1* | 9/2004 | Jeffries et al. | 707/6 |
| 6,798,777 B1 | 9/2004 | Ferguson et al. | |
| 6,845,091 B1 | 1/2005 | Ogier et al. | |
| 6,880,064 B1 | 4/2005 | Brown | |
| 2001/0040895 A1 | 11/2001 | Templin | |
| 2002/0080798 A1 | 6/2002 | Hariguchi | |
| 2002/0103631 A1* | 8/2002 | Feldmann et al. | 703/22 |
| 2002/0172203 A1* | 11/2002 | Ji et al. | 370/392 |
| 2003/0005146 A1 | 1/2003 | Miller et al. | |
| 2003/0037042 A1 | 2/2003 | Kametani | |
| 2003/0220987 A1 | 11/2003 | Pearson | |
| 2004/0008634 A1 | 1/2004 | Rangarajan et al. | |
| 2004/0013113 A1 | 1/2004 | Singh et al. | |

FOREIGN PATENT DOCUMENTS

| | | |
|---|---|---|
| WO | WO 01/05116 A2 | 1/2001 |

OTHER PUBLICATIONS

Sklower, Keith; "A Tree-Based Packet Routing Table for Berkeley Unit," Computer System Research Group, University of California, 1990, pp. 1-14, Berkeley, California, USA.

R.C. Chang et al., "Efficient IP Routing Table Lookup Scheme," IEEE Proc. Commun., vol. 149, No. 2, Apr. 2002, pp. 77-82, USA.

Butler Lampson et al., "IP Lookups Using Multiway and Multicolumn Search," IEEE/ACM Transactions on Networking, vol. 7, No. 3, Jun. 1999, pp. 324-334, USA.

A. Acharya et al., "Adaptive Algorithms for Cache-Efficient Trie Search", ALENEX'99, <cs.ucsb.edu/~acha/publications/soda98-submitted.html>.

M.J. Freedman and R. Vingralek, "Efficient Peer-To-Peer Lookup Based on a Distributed Trie", pp. 1-6, <cs.rice.edu/Conferences/IPTPS02/167.pdf>.

D. Raskovic et al., "An Implementation of Hash Based ATM Router Chip", Proceedings of the 28th Annual Hawaii International Conference on System Sciences, 1995, pp. 32-40, <ece.uah.edu/~raskovd/pdf/hicss95.pdf>.

G. Parulkar et al., "An Architecture for Monitoring, Visualization and Control of Gigabit Networks", Aug. 8, 1997, pp. 1-21, <siesta.cs.wustl.edu/~schmidt/PDF/NMVC.pdf>.

K. Mai, "IP Packet Forwarding Lookups: An Introduction and Some Hardware Solutions", Apr. 5, 2000, pp. 1-22, <velox.stanford.edu/papers/km_grpmtg_00.pdf>.

S. Nilsson and G. Karlsson, "Fast Address Lookup for Internet Routers", Proceedings of Algorithms and Experiments (ALEX98), Feb. 9-11, 1998, pp. 9-18, <rtm.science.unitn.it/alex98/book/fast-lookup.ps.gz>.

J. Cleary and W.J. Teahan, "Unbounded Length Contexts for PPM", The Computer Journal, 1993, pp. 1-9, vol. 36, No. 5, <cs.waikato.ac.nz/~wjt/papers/CJ97.ps.gz>.

B. Lampson et al., "IP Lookups Using Multiway and Multicolumn Search", May 11, 1998, pp. 1-26, <cs.ucsd.edu/~varghese/PAPERS/ToN99.pdf>.

A. Belenkiy, "Deterministic IP Table Lookup at Wire Speed", INET99, pp. 1-19, <isoc.org/inet99/proceedings/4j/4j_2.htm>.

H. Michael JI, "Fast Packet Forwarding with Configurable Processor", pp. 1-7, <caip.rutgers.edu/∞hji/ip_forward_comm_des_conf.pdf>.

V. Srinivasan and G. Varghese, "Fast Address Lookups Using Controlled Prefix Expansion", ACM Transactions on Computer Systems, Feb. 1999, pp. 1-40, vol. 17, No. 1, <cs.ucsd.edu/~varghese/PAPERS/TOCS99.pdf>.

A. Donnelly and T. Deegan, "IP Route Lookups as String Matching", 2000, pp. 1-7, <cl.cam.ac.uk/~and1000/papers/lcn2000_route_lookups_as_string_matching.ps.gz>.

* cited by examiner

US 7,039,018 B2

TECHNIQUE TO IMPROVE NETWORK ROUTING USING BEST-MATCH AND EXACT-MATCH TECHNIQUES

BACKGROUND

Information may be sent through a network using a network address. For example, a router may receive information that is to be routed to another network device. The router may use a network address, such as a destination address, to search for the appropriate routing information. As address sizes increase and the size of networks increase, additional time is required for the router to access routing tables in memory and search for the routing information. Therefore, there is a need to reduce search time for routing information and thereby improve packet forwarding speed.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
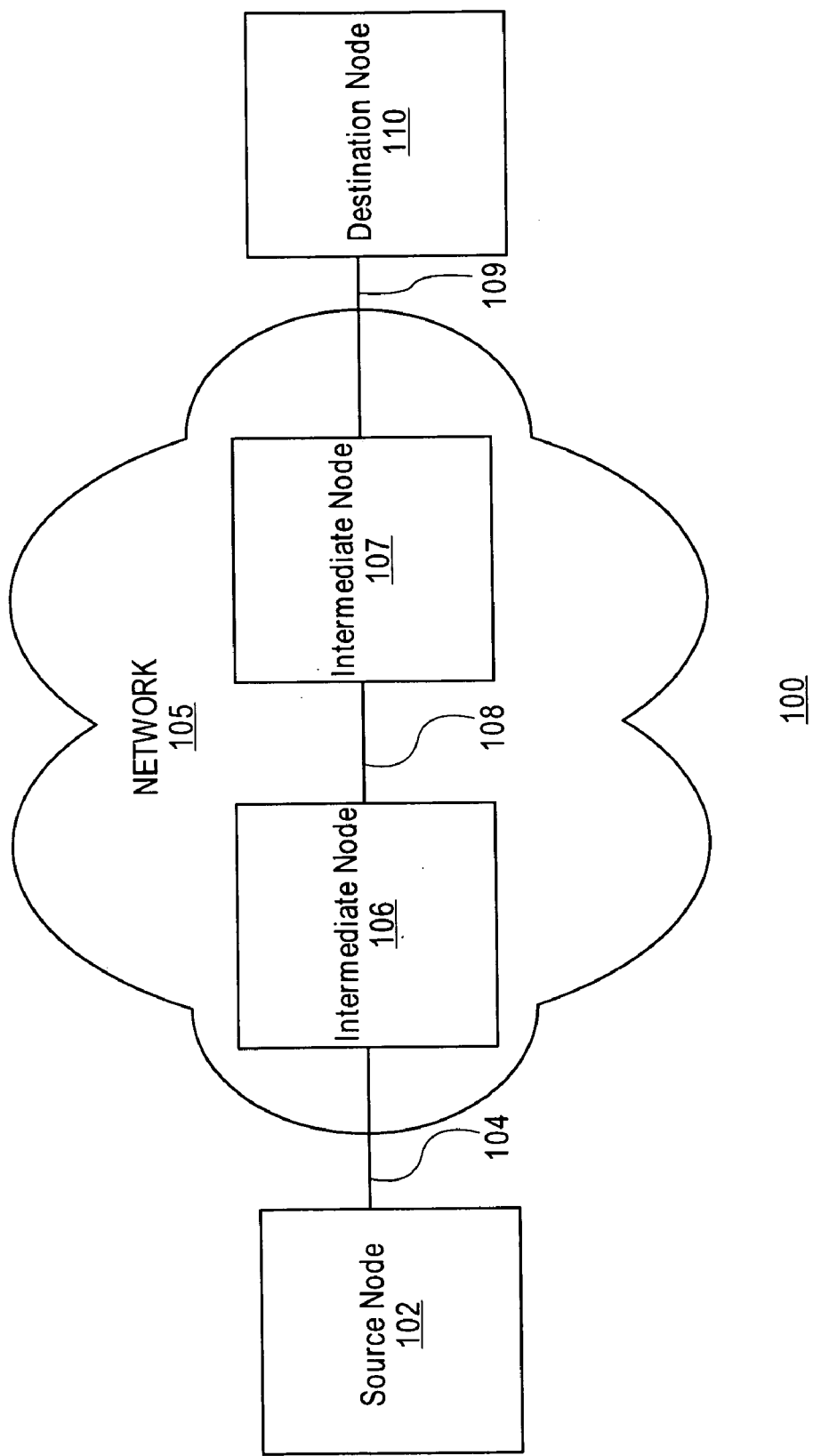
FIG. 1 is an example system suitable for practicing one embodiment of the invention.

Embodiments of the invention may comprise a method and apparatus to improve the routing of information over a network. As information travels through a network from a source to a particular destination, a number of network devices may need to search for routing information. The search may use a network address. The latency associated with a search may be directly related to the size of the network address. Typically, the more bits used to represent a network address the more memory accesses needed to search for routing information. Many routers perform a Longest Prefix Match (LPM) on the entire address to search for routing information. But this technique typically requires a large number of memory accesses, especially for larger addresses. These memory accesses can result in significant packet delay. There may be a need for a technique that allows searching for routing information while reducing the number of memory accesses and packet delay.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

A method and apparatus to search for routing information is described. According to an embodiment, a packet is received that includes an address. The address includes a first section and a second section. According to an embodiment, technique is described to search for routing information that uses a first technique on at least a portion of the first section of an address and a second technique on at least a portion of the second section of the address. In one embodiment, a best-match technique is used on at least a portion of the first section of the address and an exact-match technique is used on a portion of the second section of the address. The best-match technique may comprise, for example, a LPM technique. The exact-match technique may comprise, for example, a hashing algorithm or use of a Content Addressable Memory (CAM) or the like.

In one embodiment, a packet may be received. The packet may include a destination address. The destination address may include several sections, including a topology or network section (describing the network or network topology) and an interface ID or host section (describing the host or host interface). The term interface ID may be used herein to describe a portion of an address corresponding or describing a host or node interface/host interface. Thus, the terms host section and interface ID may be used interchangeably.

In one embodiment, the interface ID may have a globally unique value, and may be the same as or based upon a globally unique link-layer address. A routing system may search for routing information for the packet by using a LPM technique on at least a portion of the topology section of the address, and by using a hashing technique on the interface ID or host section of the address. In some embodiments, the routing system may perform a hash lookup on the interface ID only if additional routing information can be found using the interface ID or if a result of the LPM satisfies a specific condition. By performing a LPM on a first section of an address and then performing an exact-match (such as hash) on a second section of the address, fewer memory accesses may be required to find routing information.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a number of network nodes connected by one or more communications media. A network node ("node") in this context may include any device capable of communicating information, such as a computer, server, switch, router, bridge, gateway, personal digital assistant, mobile device and so forth. A communications medium may include any medium capable of carrying information signals, such as twisted-pair wire, co-axial cable, fiber optics, radio frequencies, electronic, acoustic or optical signals, and so forth.

More particularly, system 100 may comprise a source node 102, intermediate nodes 106 and 107, and a destination node 110. Source node 102, intermediate nodes 106 and 107 and destination node 110, may be connected by communications media 104, 108 and 109 as shown. Although FIG. 1 shows only one source node, two intermediate nodes and one destination node, it can be appreciated that any number of network nodes may be used in system 100 and still fall within the scope of embodiments of the invention. Furthermore, the terms "connection" and "interconnection," and variations thereof, in this context may refer to physical connections and/or logical connections.

In one example embodiment, intermediate node 106 may be a core router or backbone router, while intermediate node 107 may be an edge router. An edge router may, for example, be located on the edge of a network, and may couple one network (such as the Internet) to another network (such as a Local Area Network). A core or backbone router may be a high-speed router as part of a main network, such as the Internet.

In one embodiment, system 100 may comprise a packet-switched network 105, where network 105 includes several nodes, such as intermediate nodes 106 and 107. Packet switching in this context may refer to communicating information over a network in the form of relatively short packets in accordance with one or more communications protocols. A packet in this context may refer to a set of information of a limited length, with the length typically represented in terms of bits or bytes. An example of a packet length might be 1000 bytes. A protocol may comprise a set of instructions by which the information signals are communicated over the communications medium. For example, the protocol might be a packet switching protocol such as the Transmission Control Protocol (TCP) as defined by the Internet Engineering Task Force (IETF) standard 7, Request For Comment (RFC) 793, adopted in Sep., 1981 ("TCP Specification"), and the Internet Protocol (IP) as defined by the IETF standard 5, RFC 791, adopted in Sep., 1981 ("IP Specification"), both available from "www.ietf.org" (collectively referred to as the "TCP/IP Specification").

In one embodiment, source node 102 may comprise a node that originates a set of information for delivery to destination node 110. Destination node 110 may comprise a node that is the intended recipient of the information. Intermediate nodes 106 and 107 may comprise a node that communicates information between two or more nodes. In some cases, there may be more than one source node, destination node, and/or intermediate node. For example, in a multicast connection there may be multiple destination nodes. In another example, there are frequently multiple intermediate nodes between a source node and destination node. Information may comprise any data capable of being represented as a signal, such as an electrical signal, optical signal, acoustical signal and so forth. Examples of information in this context may include data from a voice conversation, videoconference, streaming video, electronic mail ("email") message, voice mail message, alphanumeric symbols, graphics, image, video, text and so forth.

In general operation, source node 102 may send information to destination node 110 through intermediate nodes 106 and 107 in accordance with the TCP/IP Specification. The source node breaks a set of information into a series of packets. Each packet may contain a portion of the information plus some control information. The control information may assist intermediate nodes in the network to route each packet to the destination node. Source node 102 may send the packets to intermediate node 106. Intermediate node 106 may receive the packets, store them briefly, and pass them to the next intermediate node 107. Intermediate node 107 similarly may receive the packets, store them briefly, and then pass the packets onto another node, such as destination node 110. Destination node 110 may eventually receive the entire series of packets and may use them to reproduce the original information sent by source node 102.

Figure 2:
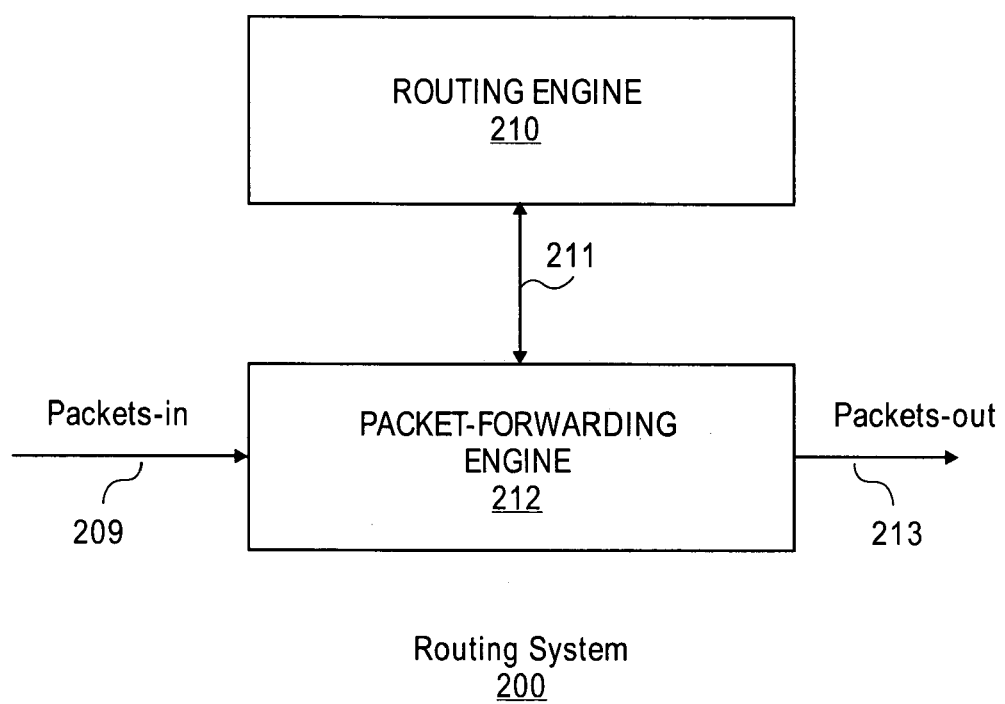
FIG. 2 is a block diagram of an example routing system in accordance with one embodiment of the invention.

FIG. 2 illustrates a block diagram of a routing system in accordance with one embodiment. Intermediate nodes 106 and 107 may comprise, for example a routing system 200 as shown in FIG. 2. Routing system 200 may incorporate functionality that may be implemented as software executed by a processor, hardware circuits or structures, or a combination of both. The processor may be one or more general-purpose or dedicated processors or network processors, such as processors from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

In one embodiment shown in FIG. 2, routing system 200 may comprise a routing engine 210 and a packet-forwarding engine 212 coupled together via line 211. The routing engine 210 may perform tasks related to routing, including communicating with other nodes in the network to collect information about the network topology and creating a forwarding table or routing table that may be accessed by the packet-forwarding engine. The routing engine 210 may periodically update the routing table as the network topology changes. The packet-forwarding engine 212 may perform a number of tasks, including receiving a packet, searching for or looking-up routing information for the packet in the routing table(s), and then forwarding the packet using the routing information. Routing information may comprise any standard routing information, such as a port number, link number, channel identifier, device identifier, queue information and so forth. A routing table may be flat, or may include a series of hierarchical routing tables, etc.

A common technique that routers use to search for routing information is a best-match technique where the router searches its router table to identify the value in its routing table that best matches a destination address of the packet. One type of best-match technique that is commonly used is a LPM technique. Routing tables may include a number of address prefixes. As an example, in a routing table, an address prefix may be a specific bit pattern that may match one or more bits of the address. The address prefix may, for example, be a specific bit pattern that matches the most significant ("left-aligned") bits of the address. The other bits in the address may be wild-card or don't care bits. The prefix length may be defined as the number of non-wildcard bits. When a packet is received via line 209, packet-forwarding engine 212 may compute which of the address prefixes in its routing table(s) has the longest match when compared to the destination address in the packet. The routing information associated with the longest matching may be considered the best or most accurate routing information. The packet is then forwarded based on the routing information, such as by forwarding the packet via an output link or port identified by the routing information. In this manner, the packet may be forwarded to the next node, either an intermediate node or the destination node.

Searching for routing information, such as by using the LPM technique, can introduce significant packet latency. Routing tables may include, for example, thousands of address prefixes. Moreover, many memory accesses are typically required to perform the LPM technique. One way that a route lookup using LPM technique may be performed is through a trie-based algorithm. A trie may be a data structure that can be used to perform a fast data search. A route may be determined by comparing one or more address bits to the trie to traverse the trie and find the longest prefix match (longest match in the trie). An example use of tries for routing table lookup is described in "A Tree-Based Packet Routing Table for Berkeley Unix," by Keith Sklower.

As an example, eight or more memory accesses may be required to perform the LPM technique on 64-bit address. IP version 6 uses 128 bits for an address, and is described in RFC 2373, "IP Version 6 Addressing Architecture," Jul., 1998. Performing a LPM on a 128-bit address may require, for example, 16 memory accesses, introducing significant delay in the packet-forwarding process, assuming that 8-bit tries are used.

The various embodiments and features of the invention described herein may be applied to addresses having a wide variety of formats and sizes. One embodiment may use an address according to an IETF Proposed Standard titled "An Internet Protocol Version Six (IPv6) Aggregatable Global Unicast Address Format," RFC 2374, Jul. 1998 ("RFC 2374"), available from "www.ietf.org". RFC 2374 delimits levels in the routing hierarchy using a set of identifiers to aggregate and conserve the initial IPv6 address space. RFC 2374 specifies three identifiers to divide bit boundaries of an address. The three identifiers include a Top-Level Aggregation Identifier (TLA), a Next-Level Aggregation Identifier (NLA) and a Site-Level Aggregation Identifier (SLA). The initial allocations to an Internet Service Provider (ISP) may be made from a TLA or sub-TLA. Those organizations may then allocate NLAs to their customer ISPs, who in turn may assign SLAs for end-users to create their own local topology. The interface identifier may represent the host portion of an IPv6 address as represented by the right-most 64 bits of the address.

Figure 3:
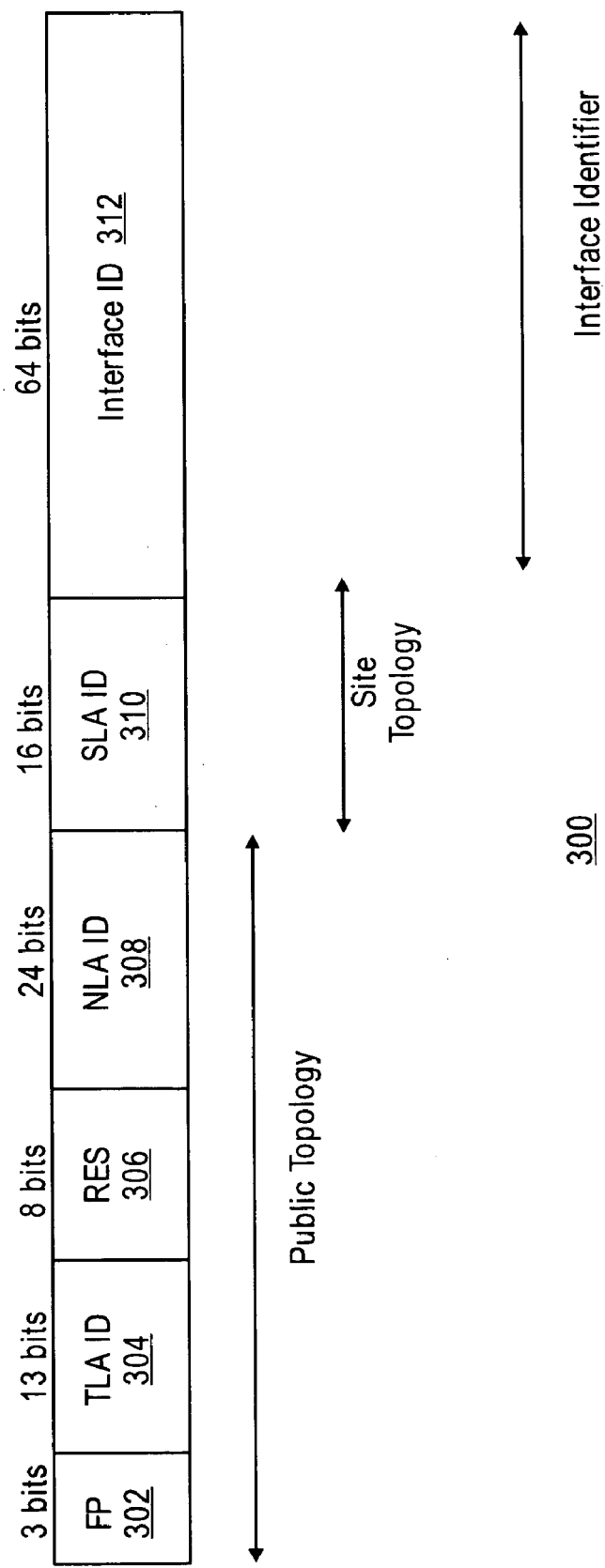
FIG. 3 illustrates an example address format suitable for use with one embodiment of the invention.

FIG. 3 illustrates an example address format suitable for use with one embodiment of the invention. FIG. 3 illustrates an address format 300 in accordance with RFC 2374. Address format 300 may have a total length of 128 bits. In one embodiment of the invention, address format 300 may comprise a Format Prefix (FP) 302, a TLA 304, a Reserved Field (RES) 306, a NLA 308, a SLA 310 and an Interface Identifier (Interface ID) 312. The TLA ID 304, the NLA ID 308 and SLA ID 310 may comprise a topology section of the address format 300 because these fields relate to the network topology. As stated previously, TLA 304 may represent the top level in the routing hierarchy. According to an embodiment, default-free routers will have a routing table entry for every active TLA, and typically have additional entries providing routing information for the TLA in which they are located. NLA 308 may be used by organizations assigned a TLA to create an addressing hierarchy and to identify sites. SLA 310 may be used by an individual organization to create their own local addressing hierarchy and identify subnets. The topology section may also be referred to as a network section (or network portion) of the address, while the interface identifier may be referred to as a host section or host portion of the address since the interface identifier may identify a host interface.

Referring to FIG. 3, Interface identifier 312 may be used to identify interfaces on a link. The interface identifiers should be unique on that link. The interface identifier may be unique over a broader scope, such as unique globally. In some cases, an interface identifier will be the same as or based upon the interface's link-layer address, such as an IEEE 802.3 Ethernet MAC address as an example. For example, the interface identifier 312 may be globally unique (i.e., have a global scope) if it is the same as or is based upon a globally unique MAC address. The interface identifier 312 may be 64 bits in length, for example, but it could be any length. In one example embodiment, the interface identifier 312 is constructed in IEEE EUI-64 format from another address, such as an IEEE 802.3 MAC address. The IEEE 802.3 MAC address is 48 bits in length. A globally unique 64-bit interface identifier (in EUI-64 format) can be created from a MAC address as described in IEEE, "Guidelines for 64-Bit Global Identifier (EUI-64) Registration Authority, Mar., 1997 and "Transmission of IPv6 Packets Over Ethernet Networks," by M. Crawford. While specific examples or embodiments of an interface identifier 312 are described above, the interface identifier may be provided in a variety of different formats and lengths and is not limited to IPv6 format or length.

Figure 4:
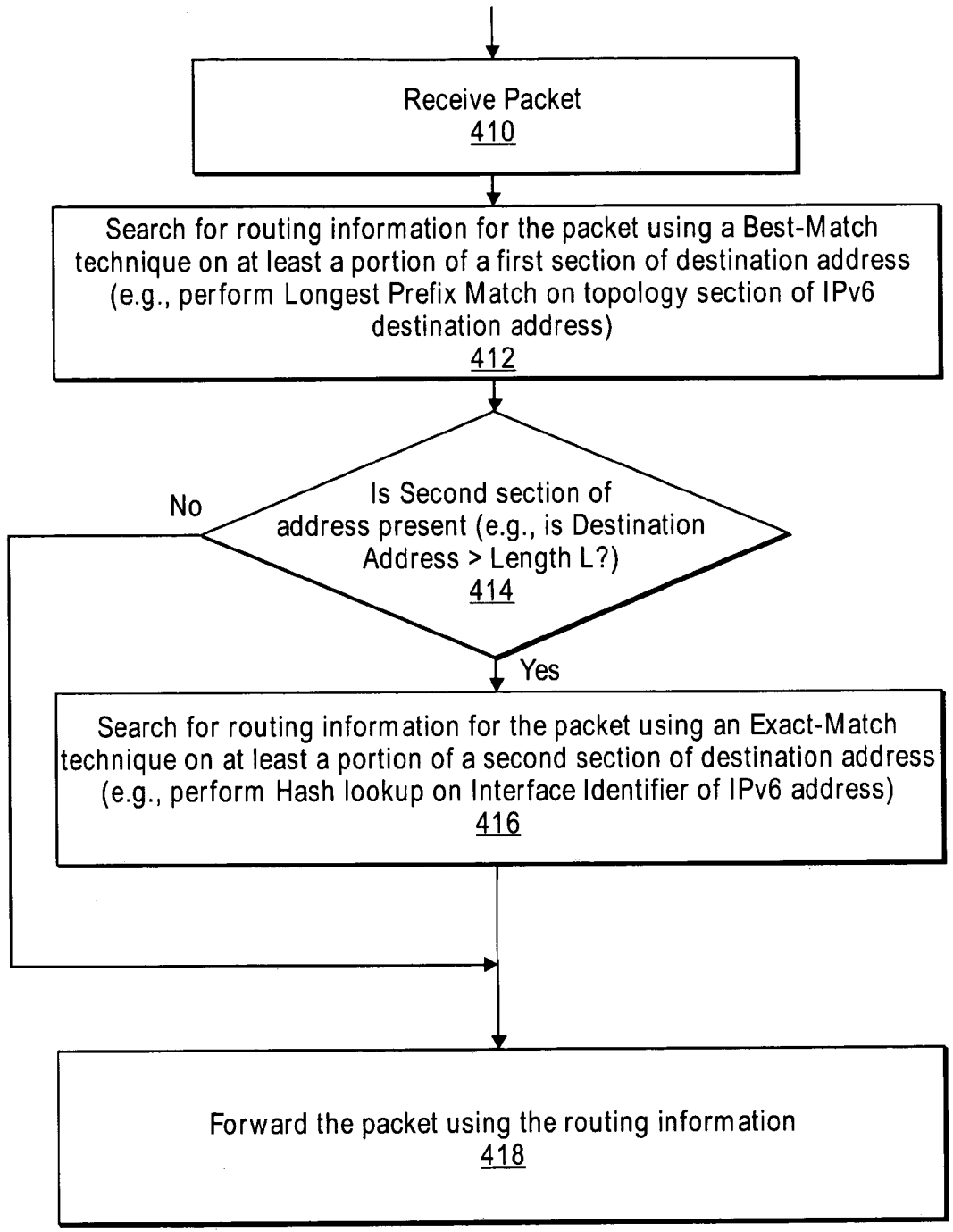
FIG. 4 is a block flow diagram of processing logic which may be performed by a routing system in accordance with one embodiment of the invention.
Figure 5:
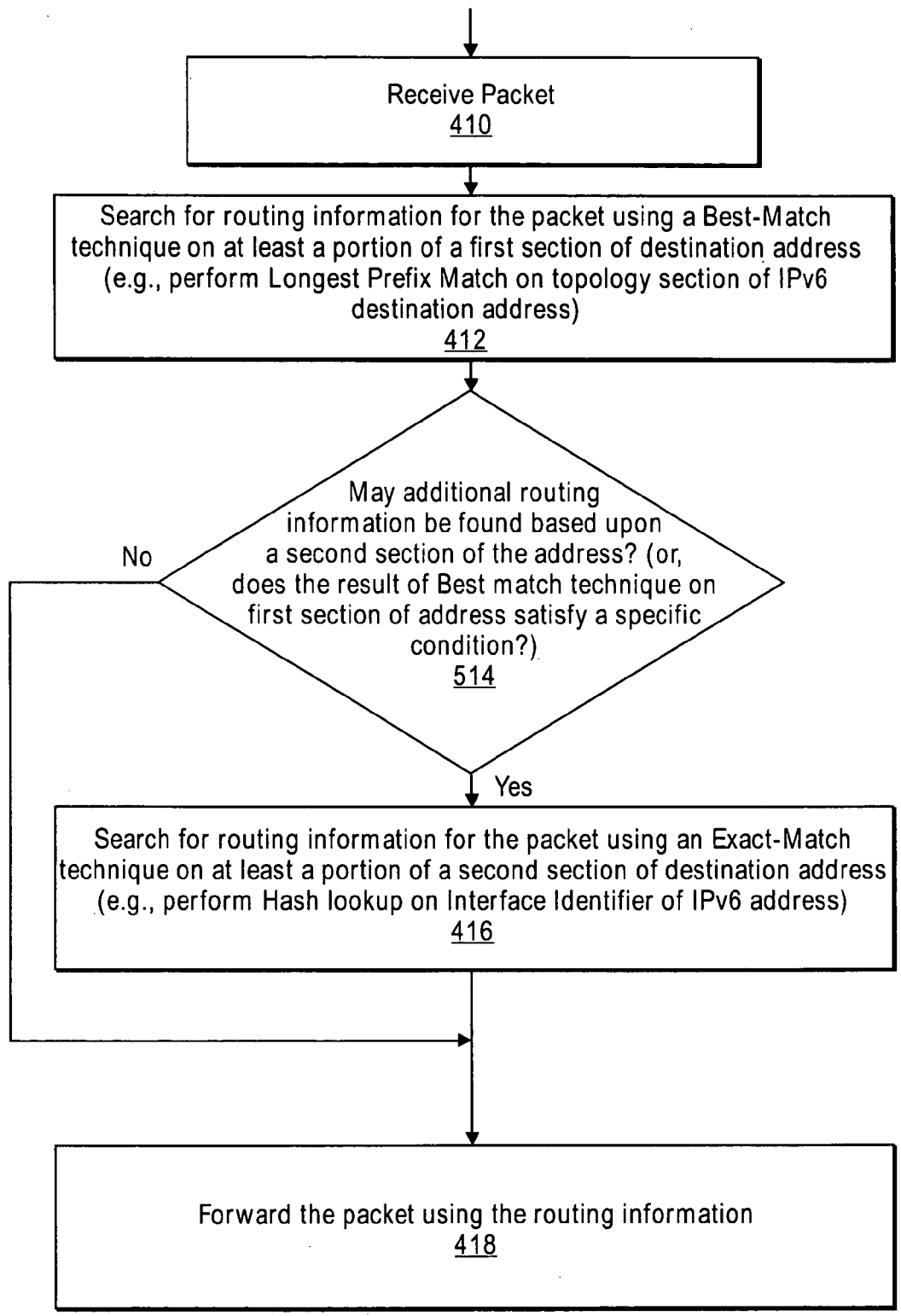
FIG. 5 is a block flow diagram of processing logic which may be performed by a routing system in accordance with one embodiment of the invention.

The operations of systems 100 and 200 as well as the use of address format 300, may be further described with reference to FIGS. 4–6. Although FIGS. 4 and 5 presented herein may include a particular processing flow logic, it can be appreciated that the processing logic merely provides an example of how the general functionality described herein can be implemented. Further, each operation within a given processing flow logic does not necessarily have to be executed in the order presented unless otherwise indicated.

FIG. 4 is a block flow diagram of processing logic that may be performed by a routing system in accordance with one embodiment of the invention. In one embodiment of the invention, the routing system may refer to the software and/or hardware used to implement the functionality for routing information as described herein. In this embodiment of the invention, the routing system may be implemented as part of intermediate node 106 or intermediate node 107. It can be appreciated that this functionality, however, may be implemented by any device, or combination of devices, located anywhere in a communication network and still fall within the scope of embodiments of the invention.

FIG. 4 may illustrate processing logic to search for routing information. A packet is received at block 410. According to one embodiment, the packet may include a destination address, including at least two address sections. Two address sections may include the topology section and the interface ID 312, as examples. The topology section or network section may include all or part of the TLA ID 304, NLA ID 308 and SLA ID 310, for example. Other address sections may alternatively be defined or used.

At block 412, the routing system may search for routing information for the packet using a first technique (such as a best-match technique) on at least a portion of a first section of the destination address. A best-match technique may search for the best match, and may not necessarily require a match to the entire address. For example, the routing system may perform a LPM on at least a portion of the topology section of the destination address provided in the received packet. For example tries or other technique may be used as part of the LPM technique.

In an alternative embodiment, unused portions of the first section (or topology section) of the address may be skipped in the best-match or LPM technique. For example, the reserved fields will be zero when they are unused, and thus can be skipped. This will save memory accesses.

At block 414, it is determined whether or not an interface identifier (interface ID) of the destination address is present in the received packet. If the destination address includes an interface ID, then an exact-match technique may be used on the interface ID as described below in 416. Otherwise, if no interface ID is present, which may be indicated, for example, by the presence of zeros in the least significant 64 bit of the destination address, then it is probably unnecessary to process the least significant 64 bits. One way to determine whether an interface ID is present in a destination address is to determine whether the destination address is greater than a predetermined length L, such as 64 bits. In such an example, if there are more than 64 bits in the destination address, then this may indicate the presence of an interface ID. Thus, if the address is longer than L, then it may be beneficial to using a hashing algorithm or exact match on a portion of the address (such as the interface ID) since many memory accesses might be required otherwise. If the address is longer than length L, the processing flow may proceed to block 416. Otherwise, flow proceeds to block 418. Block 414 may be optional. Some embodiments will include block 414, while other embodiment may omit block 414.

At block 416, the routing system may search for (additional or more specific) routing information using an exact-match technique on at least a portion of a second section (such as an interface ID) of the destination address. There are several exact-match techniques that may be used, including the use of a Content Addressable Memory (CAM) and the use of a hashing algorithm. A hashing algorithm may be implemented using a hash table, for example. A hashing algorithm may, for example, refer to a transformation of a string of characters into a usually shorter fixed-length value that represents the original string. Hashing is frequently used to index and retrieve items in a database because it is typically faster to find the item using the shorter hashed value than to find it using the original value.

At block 418, the routing system then forwards the packet using the routing information. In some cases, the packet may be forwarded using routing information (e.g., port number) obtained from block 416. In other cases, routing information may be used that was found from block 416, which may use the exact-match technique on a second section of the destination address.

FIG. 5 is a block flow diagram of processing logic that may be performed by a routing system in accordance with one embodiment of the invention. In FIG. 5, block 414 (FIG. 4) has been replaced by block 514. The other blocks in FIG. 5 are the same as the blocks in FIG. 4.

At block 514, it is determined whether additional routing information may be found based upon a second section of the destination address (e.g., based upon all or part of the interface ID 312). There are many different ways to determine whether the second section of the address, such as the interface ID, may render additional routing information for the packet for the routing system that received the packet. If the routing system is part of an edge router, for example, the routing system may determine based upon the value of the first section of the address whether or not the packet is addressed to a host or node within its a local network coupled to the routing system. If the packet is addressed to a node within a local subnetwork that is attached to the routing system, then the routing system may use the second section (interface ID) to search for additional or more specific routing information. These are just examples. Many other techniques may be used to determine whether the second section or the interface ID may render further routing information for the packet.

Referring to block 514, according to one embodiment, the routing system may perform the exact-match technique of block 416 if a result of the best-match (or LPM) technique performed in block 412 satisfies a specific condition. There are many conditions that may be used here. For example, if the best matching value in the routing table matches a predetermined or minimum number of bits of the address, such as matching the TLA, NLA and SLA of the destination address, then additional routing information may be available by searching for routing information using the interface ID. Thus, in this example embodiment, block 416 may be performed if the best-match in the routing table matches the TLA ID, NLA ID and SLA ID, or substantially matches the second section, etc.

In another embodiment, the topology section (first section) of the address may not necessarily be unique (e.g., non-unique), while the interface ID (second section) may be a globally unique value. For example, the interface ID may be the same as or based upon a globally unique MAC address, such as a MAC address having global scope. Thus, in one embodiment, a best-match technique may be performed on the non-unique portion of the address, and an exact-match technique may be used on the unique section of the address to search for routing information.

Performing a LPM technique on the entire 128-bit IPv6 address to search for routing information may result in a large number of memory accesses and introduce significant packet delay. For example, 16 memory accesses may be required to perform a LPM on a 128-bit IPv6 address, if 8-bit tries are used. To decrease packet latency, a best-match technique, such as LPM, may be used on at least a first section of an address and an exact-match technique, such a CAM or hashing algorithm, may be used on a second section of an address to search for routing information, as described above. The use of an exact-match technique is especially appropriate for a section of the address that is of global scope or globally unique since this will typically render a single match from the address. An example of an address section that is globally unique may be an IPv6 interface ID that is the same as or based upon a unique link-layer address, such as a MAC address. It may be impractical to apply an exact match or hashing technique to the host portion of an IPv4 address since this portion may not be unique, thus possibly resulting in erroneous hash values. The use of both a best-match technique on one address section (e.g., 8 memory accesses) and an exact-match technique on another preferably unique address section (e.g., 1 memory address) may result in significantly fewer memory accesses than using a LPM on the entire 128-bit address.

According to an embodiment, a user option (e.g., compile time option, or option selectable at a user interface) is available to select either: 1) to search for routing information using the combination of best-match and exact-match techniques as described above, and 2) to search for routing information using only best-match technique on the entire address. For example, in some types of routers or routing systems, such as core or backbone routers, the interface ID of an address may be used infrequently to search for routing information. Thus, in some instances, the benefit of such a technique may be less for a core router than for an edge router, since an edge router may be more likely to use the interface ID of an address to search for routing information. Thus, a user may select the hash option for the interface ID for edge routers, while selecting to use a LPM technique to be used for the entire address for core routers, for example.

Figure 6:
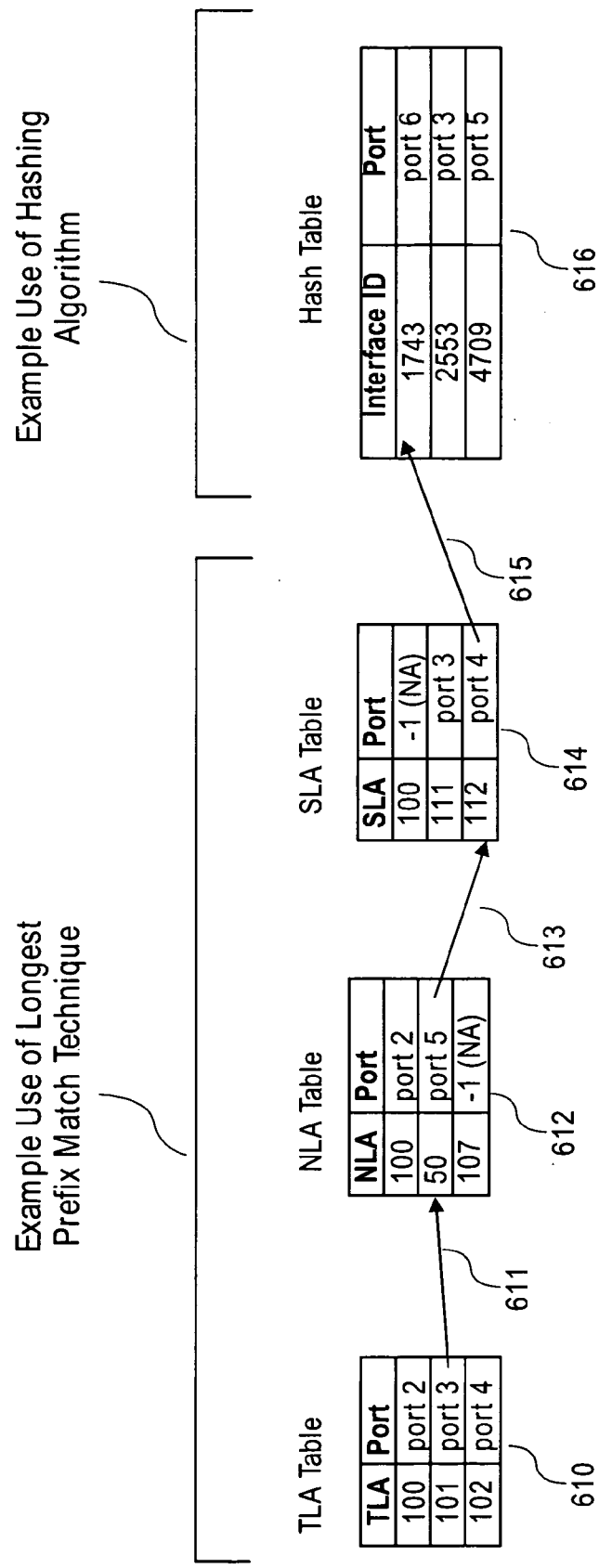
FIG. 6 illustrates an example use of tables to search for routing information in accordance with one embodiment of the invention.

FIG. 6 illustrates an example use of tables to search for routing information in accordance with one embodiment of the invention. The example shown in FIG. 6 includes an example use of LPM Technique on a topology section of an address and an example use of a hashing algorithm on an interface ID. A packet is received at a routing system and includes a destination address. The destination address in this example includes a TLA ID=101, a NLA ID=50, a SLA ID 112 and an interface ID=1743. As noted above, the TLA ID, NLA ID and SLA ID may be referred to as a topology section or network section of an address.

As shown in FIG. 6, the routing system includes several routing tables, including a TLA table 610, a NLA table 612 and a SLA table 614. These tables will be used by the routing system to perform a LPM lookup on the TLA ID, NLA ID and SLA ID, respectively. While separate tables are shown, the route lookup using the topology section may generally use one or more tries. A series of routing tables or other techniques can be used as part of the LPM technique using the topology section of the address. While many approaches or techniques can be used to perform the LPM technique, FIG. 6 illustrates just one example. In another example embodiment, each table (610, 612 and 614) may comprise a series of tries. There are many different ways to represent data and perform route lookup using a LPM technique.

According to the example shown in FIG. 6, the routing system looks up TLA ID=101 in TLA table 610. Port 3 is identified as routing information. This lookup in table 610 also provides a pointer 611 to the NLA table 612.

Next, referring to FIG. 6, the routing system looks up the NLA ID=50, to find port 5 as routing information, as well as a pointer 613 to the SLA table 614. This value (TLA ID=101, NLA ID=50) is a longer matching prefix than TLA ID=101, and thus, port 5 would be considered better or more accurate routing information for this packet than port 3.

If the routing system fails to find a match in one of the routing tables, then the routing system will typically use the routing information from the last table where a match was found. In this example, if the NLA ID was instead NLA ID=107, then a lookup in NLA table 612 would find no entry for 107, as indicated by the −1 or NA value in table 612. In such a case, the Longest Matching Prefix would be TLA ID=101 (port 3 from TLA table 610). The search for routing information would stop at the NLA table because no match was found in the NLA table 612 (in this particular example).

Next, assuming that the NLA ID=50 and a match was found in the NLA table 612, the routing system looks up the SLA ID=112 in SLA table 614 to find port 4 as the routing information and a pointer to hash table 616.

In this example, the LPM technique found a value in the routing tables 610, 612 and 614 that matched or substantially matched the topology section of the address (e.g., the TLA ID, NLA ID and SLA ID). In one embodiment, this may indicate that additional routing information may be found based on the interface ID. In another embodiment, the routing system may perform a hash of the second section of the address (e.g., interface ID) if no further routing information is available from the first section of the address (e.g., the topology section of the address), or if additional routing information may be found only based upon the second section. In one embodiment, because the second section (e.g., interface ID) is globally unique, it may be beneficial to use a hash table to perform a lookup for the interface ID to reduce the number of memory accesses.

Thus, the routing system next looks up the interface ID=1743 in the hash table 616. The interface ID=1743 looks up to port 6 in the hash table 616. Thus, in this example, the most accurate or best routing information for this packet is port 6. The packet is then forwarded via port 6 to the next intermediate node or the destination node, whichever is next.

Figure 7:
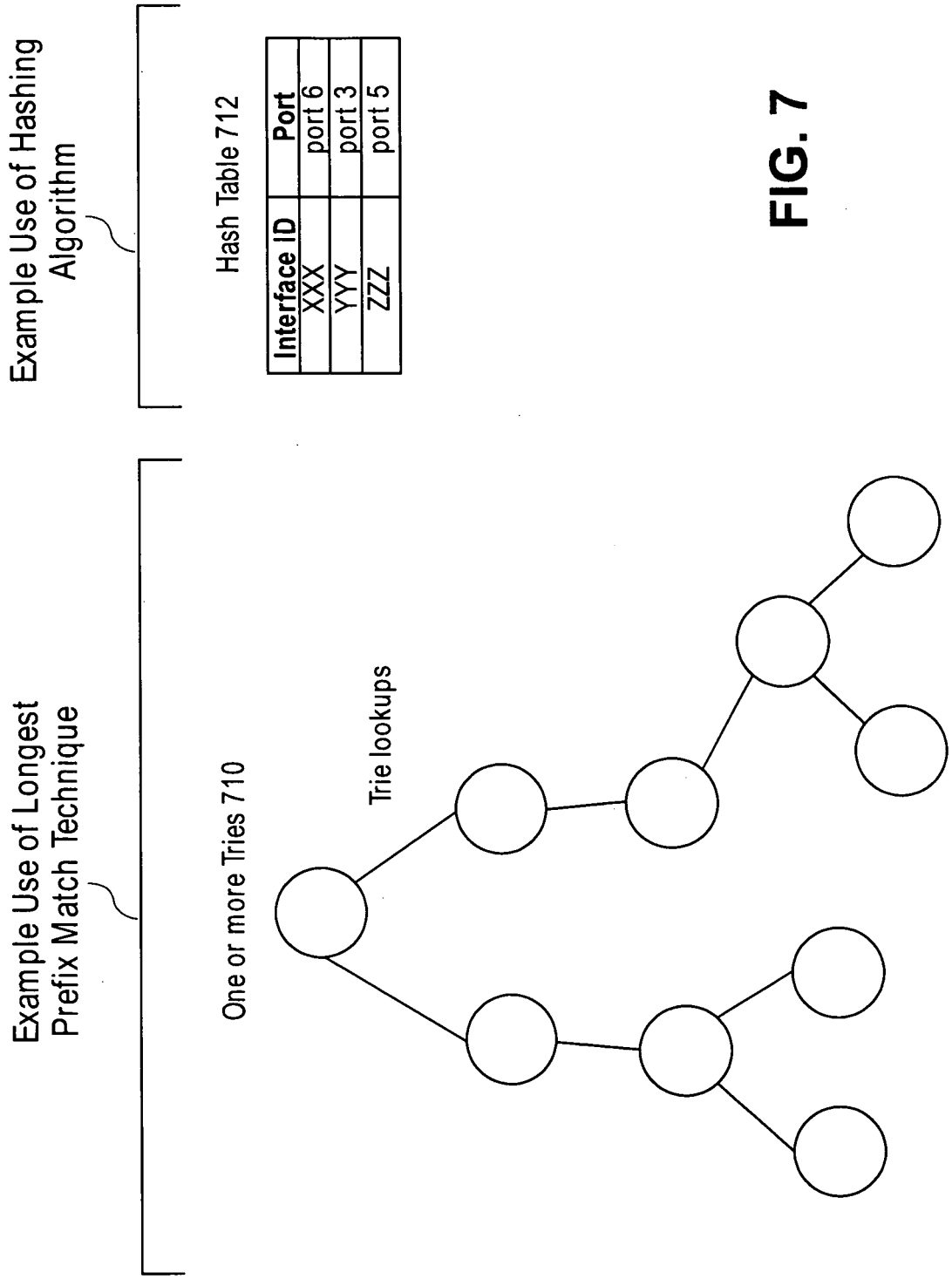
FIG. 7 illustrates another example use of an LPM technique and a hash technique to search for routing information in accordance with one embodiment of the invention.

FIG. 7 illustrates another example use of an LPM technique and a hash technique to search for routing information in accordance with one embodiment of the invention. According to the example embodiment shown in FIG. 7, a LPM technique is used on a first section (e.g., network section or topology section) of the destination address using one or more tries 710 or trie lookups. If a host section or interface ID is present in the destination address of the received packet, then the route lookup may continue by using a hashing algorithm on the interface ID. For example, as shown in FIG. 7, the interface ID may be looked up in the hash table 712. In this manner, by combining both a LPM technique on a first section of an address (such as a network section or topology section) and an exact match technique (such as hashing algorithm or CAM) on a second section of the address (such as a host section or interface ID), a route lookup may be performed quicker and with fewer memory accesses.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method to search for routing information, comprising:
   receiving a packet including an address, the address including at least a first section having a topology section of the address and a second section having an interface identifier of the address, said topology section comprising one or more of a top-level aggregation identifier, a next-level aggregation identifier, and a site-level aggregation identifier; and
   searching for routing information for said packet using both a first technique on at least a portion of the first section and a second technique on at least a portion of the second section.

2. The method of claim 1 wherein the address comprises a destination address.

3. The method of claim 1 wherein the address comprises an Internet Protocol (IP) address.

4. The method of claim 1 wherein the address comprises a 128-bit address assigned in accordance with Internet Protocol (IP) version six (IPv6).

5. The method of claim 1 wherein the first technique comprises a best-match technique, and the second technique comprises an exact-match technique.

6. The method of claim 5 wherein the best-match technique comprises a longest-prefix match technique.

7. The method of claim 5 wherein the first technique comprises using one or more routing tables to lookup routing information for the packet based on at least a portion of the first section of the address using a Longest Prefix Match technique.

8. The method of claim 7 wherein the first section of the address comprises a topology section of a destination address.

9. The method of claim 5 wherein the exact-match technique comprises using a hashing algorithm to search for routing information for the packet based on at least a portion of the second section.

10. The method of claim 9 wherein the second section of the address comprises an interface identifier.

11. The method of claim 9 wherein the hashing algorithm comprises using a hash table to lookup routing information for the packet based on at least a portion of the second section of the address.

12. The method of claim 5 wherein the exact-match technique comprises using a content addressable memory to search for routing information for the packet based on at least a portion of the second section.

13. A method to search for routing information, comprising:
receiving a packet including an address, the address including at least a first section and a second section, the first section is a non-unique section that comprises at least a portion of a topology section of an Internet Protocol version 6 (Ipv6) comprising one or more of a top-level aggregation identifier, a next-level aggregation identifier, and a site-level aggregation identifier, the second section being globally unique; and
searching for routing information for said packet using both a Longest Prefix Match technique on at least a portion of the first section of the address and using an exact-match technique on at least a portion of the second section of the address.

14. The method of claim 13 wherein the second section of the address comprises a globally unique interface identifier.

15. The method of claim 14 wherein the interface identifier comprises or is based upon a link-level address of an interface.

16. The method of claim 14 wherein the interface identifier comprises or is based upon a IEEE 802.3 Media Access Control (MAC) address of an interface.

17. A method to search for routing information, comprising:
receiving a packet including an address, the address including at least a first section having a topology section of the address and a second section having an interface identifier of the address, said topology section comprising one or more of a top-level aggregation identifier, a next-level aggregation identifier, and a site-level aggregation identifier;
searching for routing information for said packet using a best-match technique on at least the first section of the address;
searching for additional routing information using an exact-match technique on at least the second section if a result of the searching using the best-match technique satisfies a predetermined condition.

18. The method of claim 17 wherein the searching for additional routing information comprises using a hashing technique on at least the second section if the searching using the best-match technique resulted in substantially a complete match of the first section of the address in the best-match technique.

19. A network apparatus comprising:
a forwarding engine, the forwarding engine to receive a packet including an address, the address including at least a first section having a topology section of the address and a second section having an interface identifier of the address, said topology section comprising one or more of a top-level aggregation identifier, a next-level aggregation identifier, and a site-level aggregation identifier, the forwarding engine to search for routing information for said packet using a best-match technique on at least a portion of the first section, and the packet forwarding engine to search for additional routing information for the packet using an exact-match technique on at least a portion of the second section if a result of the searching using the best-match technique satisfies a predetermined condition or if additional routing information can be found for the packet based on the second section.

20. The apparatus of claim 19 wherein the best-match technique comprises a Longest Prefix Match and the exact-match technique comprises a hashing algorithm.

21. An apparatus comprising a forwarding engine, the forwarding engine to receive a packet including an address, the address including at least a first section having a topology section of the address and a second section having an interface identifier of the address, said topology section comprising one or more of a top-level aggregation identifier, a next-level aggregation identifier, and a site-level aggregation identifier, the forwarding engine to search for routing information for the packet using a first technique on at least a portion of the first section of the address, the forwarding engine to also search for routing information for the packet using a second technique on at least a portion of the second section of the address if a result of the searching using the first technique satisfies a predetermined condition or if additional routing information can be found based upon the second section.

22. The apparatus of claim 21 wherein the first technique comprises a best-match technique on at least a portion of a topology section of an address, and the second technique comprises an exact-match technique on at least a portion of an interface ID or host portion of an address.

23. The apparatus of claim 22 wherein the best-match technique comprises a Longest Prefix Match technique, and the exact-match technique comprises one of a content addressable memory (CAM) and a hashing algorithm.

* * * * *

UNITED STATES PATENT AND TRADEMARK OFFICE
CERTIFICATE OF CORRECTION

PATENT NO. : 7,039,018 B2  Page 1 of 1
APPLICATION NO. : 10/197981
DATED : May 2, 2006
INVENTOR(S) : Singh et al.

It is certified that error appears in the above-identified patent and that said Letters Patent is hereby corrected as shown below:

In column 11, line 27, in Claim 13, delete "(Ipv6)" and insert -- (IPv6) --, therefor.

Signed and Sealed this

Twenty-ninth Day of September, 2009

David J. Kappos
*Director of the United States Patent and Trademark Office*